US005760932A

United States Patent [19]

Perchak

[11] Patent Number: 5,760,932

[45] Date of Patent: *Jun. 2, 1998

[54] TARGET FOR LASER LEVELING SYSTEMS

[75] Inventor: Robert M. Perchak, Dayton, Ohio

[73] Assignee: Mirage Development Ltd., Dayton, Ohio

[*] Notice: The term of this patent shall not extend beyond the expiration date of Pat. No. 5,710,647.

[21] Appl. No.: 520,853

[22] Filed: Aug. 30, 1995

[51] Int. Cl.$^6$ .............................. G02B 5/32; G01B 11/26; G01C 1/10

[52] U.S. Cl. .............................. 359/15; 356/138; 356/149

[58] Field of Search .............................. 359/15, 17, 19; 356/138, 373, 395, 399, 347, 348; 33/292; 235/454, 467

[56] References Cited

U.S. PATENT DOCUMENTS

| | | | |
|---|---|---|---|
| 3,836,258 | 9/1974 | Courten et al. | 356/138 |
| 4,365,864 | 12/1982 | Cowley et al. | 385/31 |
| 5,016,950 | 5/1991 | Smith | 359/15 |
| 5,541,727 | 7/1996 | Rando et al. | 356/149 |
| 5,566,024 | 10/1996 | Rauch | 359/571 |
| 5,570,189 | 10/1996 | Salmon | 356/399 |

Primary Examiner—Paul M. Dzierzynski
Assistant Examiner—Audrey Chang

[57] ABSTRACT

The invention provides a passive hand held target for use with a scanning light beam, particularly a laser beam, in which the beam impinged upon (i.e. input to) the target is divided and the resultant beams are directed to a viewing screen witha diffusing function, where an observer can discern equality or inequalities of their images as the target is moved to center its input window with respect to the scanning beam. Adjustment of the target then provides a reference for marking of a surface adjacent the target. The beam divider may include a mask which produces a pair of symmetrical easy to compare beam shapes. An alternative beam divider is an axicon. Holograms can be used as equivalent optical devices for the lens and axicon beam dividing function and for the diffusing viewing function, as well as to direct the beams at convenient angles.

19 Claims, 7 Drawing Sheets

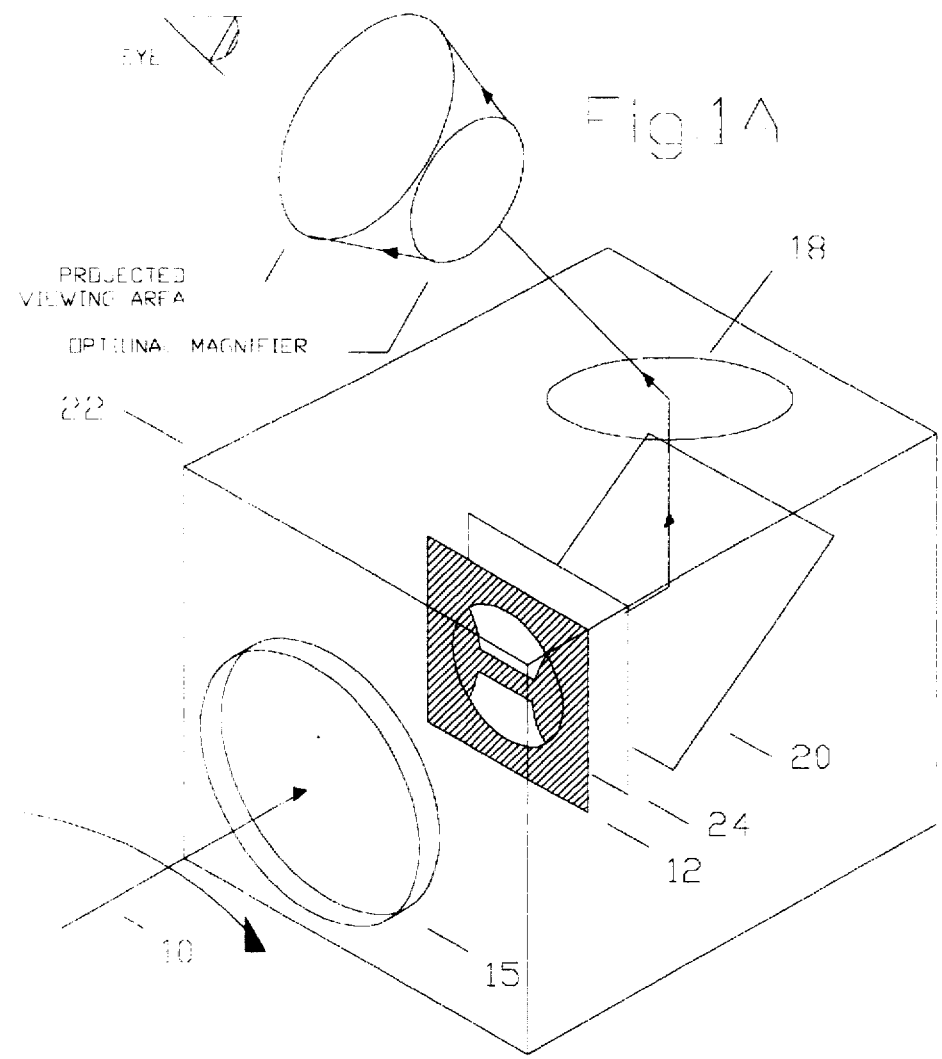

Fig. 3
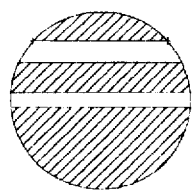 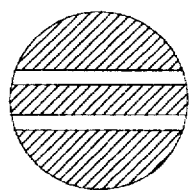 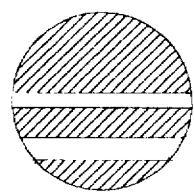
Fig. 2B · Fig. 2A · Fig. 2C
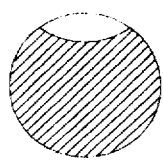 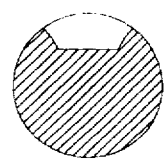 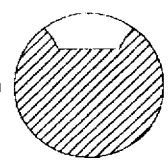 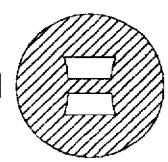 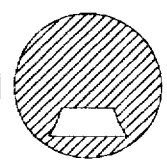 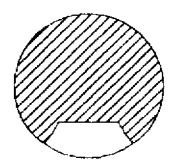 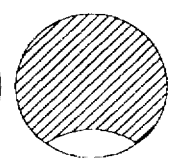

| BEAM POSITION | SCREEN | |
|---|---|---|
| ABOVE CENTERLINE | ▬ | |
| | | ▬ |
| SLIGHTLY ABOVE | ▬ | ▬ — DIM |
| | | ▬ — BRIGHT |
| CENTER | ▬ | ▬ |
| | ▬ | ▬ |
| SLIGHTLY BELOW | | ▬ |
| | ▬ | ▬ |
| BELOW CENTERLINE | | ▬ |
| | ▬ | |

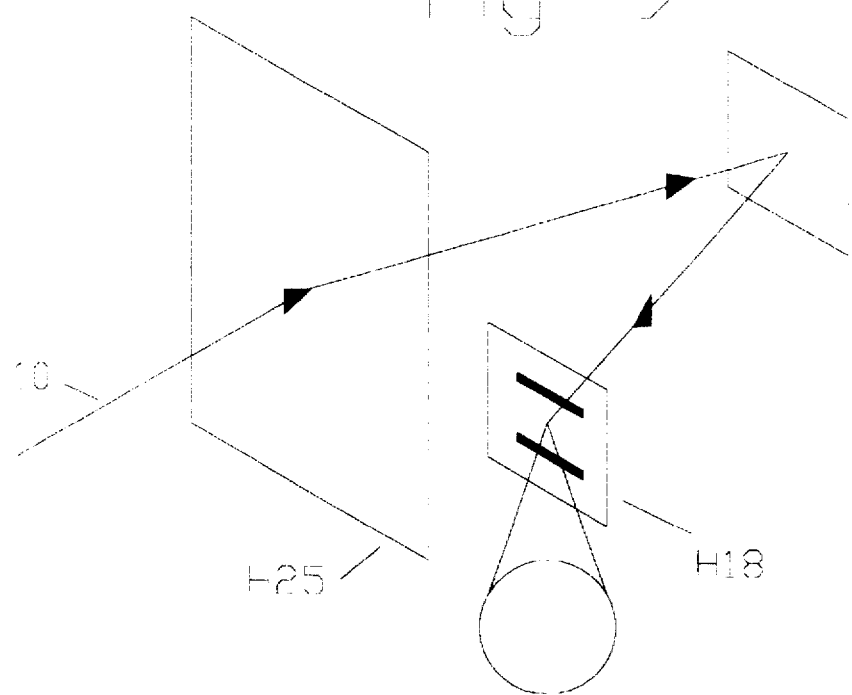
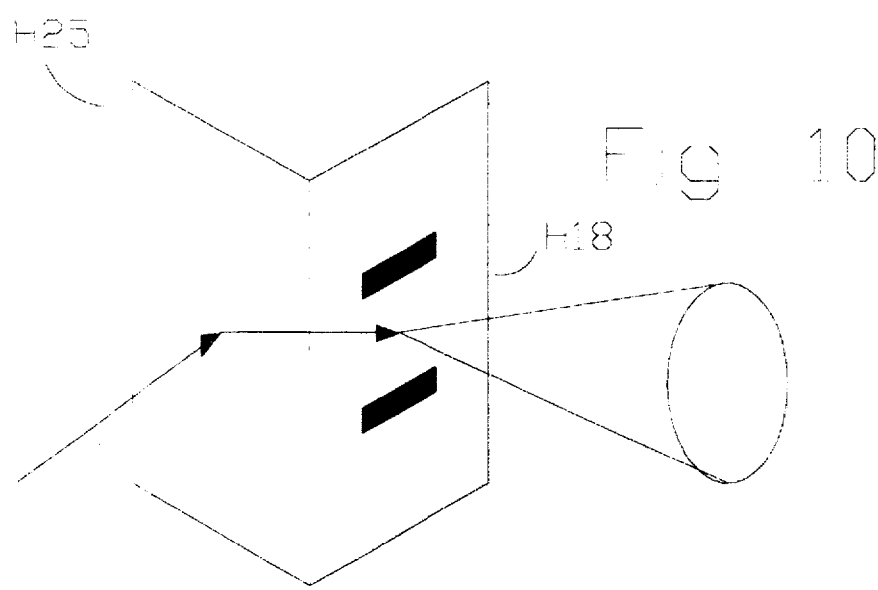

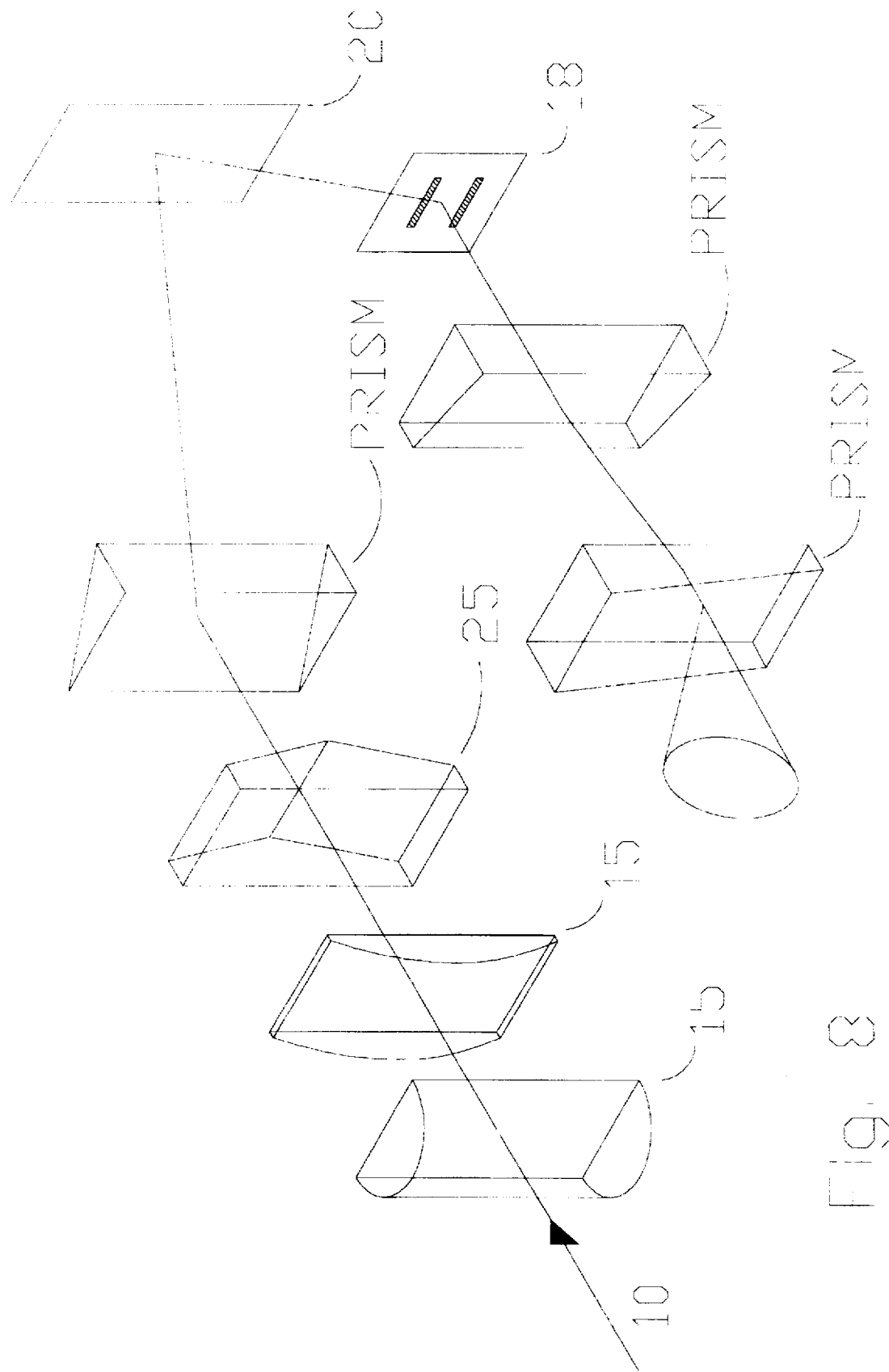

TARGET FOR LASER LEVELING SYSTEMS

FIELD OF THE INVENTION

This invention relates to target devices for viewing of a scanning light beam, preferably a laser beam, in systems used to develop an accurate level or elevation position.

BACKGROUND OF THE INVENTION

Many techniques exist today for viewing scanning laser beams at a distance, as in laser beam leveling systems. A typical system is disclosed in U.S. Pat. No. 4,221,483 issued 9 Sep. 1980. These devices are often portable instruments, and produce a collimated beam of laser light which is directed on a horizontal axis and rotated (scanned), most conveniently in a circle, to produce a trace for making one or more reference level marks about an area, along a wall, etc. The instrument is leveled at its location so the laser beam scans in a truly horizontal plane. Various targets are used to assist in referencing the point or points at which the beam impinges the object (e.g. surface) to be marked.

Some of these target techniques are:
1. "White paper card"—a diffuse reflective scatterer over a broad area, in which views are relatively dim because energy is spread out;
2. "Ground glass or back side aluminized ground glass"—brighter and less diffuse than white card;
3. "Corner cube reflectors"—such as in taillight reflectors for automobiles, and which have very bright and very narrow angle of view;
4. Scotch (i.e. 3M) retroreflective film—similar to the corner cube reflectors;
5. The VISILINE (trademark of Spectra-Physics Laserplane, Inc.) target, as disclosed in U.S. Pat. No. 5,095,629.

The last mentioned device is a molded plastic target with a side for transmission and one side for reflection. This form of target device incorporates a fresnel lens and/ or group of miniprism facets which serve to direct the light off-axis. By adding a specially designed surface texture to the other side of the target, a particular shape of diffuse pattern can be generated.

The target material can additionally be molded with a dye which excludes all wavelengths except a moderately narrow band around the wavelength of the laser to be viewed. Usually the laser is a HeNe laser or a laserdiode operating around 633nm. These are used because of cost and availability. A yellow-green laser is sometimes used as these are more suitable to the sensitivity of the human eye.

The aforementioned targets are typically used with a rotating laser beam of less than 2 milliwatts and at a rotational speed of less than 600 rev./min. This power and scanning speed limit results from government regulations intended to protect the eyes of users. The rotating beam provides for the definition of a plane, particular suitable for contracting, architectural, and surveying purposes.

However, at large distances from the laser, the time during which the laser beam sweeps across the target area is very short. For example, a 2 inch (5 mm.) wide target that is 100 feet (30.5 m.) away from the instrument would be illuminated by the laser beam only about 270 micro-seconds at 60 rev./min. This is less than the integration time of the human retina, and thus causes the beam to appear dimmer to the user.

The projected beam is typically Gaussian or near Gaussian, which means that the edges of the beam are not clearly defined. Furthermore, as the target is moved farther from the source, the beam spreads and becomes more degraded. Thus, using an "edge" introduces error. If a user tries very carefully to determine the center of the beam, difficulty still arises due to the lack of contrast.

SUMMARY OF THE INVENTION

The present invention makes use of the fact that the human eye and optical/nervous system is extremely good at splitting a distance in half or finding the center of a circle, etc. It is also very good at perceiving differences in brightness. It is not good at determining absolute brightness, but so long as the retina does not reach saturation it is a good detector of difference in brightness. The present invention also makes use of this fact.

The principal object of this invention is to provide a passive target for use with a scanning light beam, particularly a laser beam, in which the beam impinged upon (i.e. input to) the target is split and the split beam is directed to an imaging or viewing screen where an observer can discern equality or inequalities of the images as the target is moved to center its input window with respect to the beam; wherein adjustment of the target then provides a reference for marking of a surface adjacent the target; and wherein the beam splitter includes a mask which produces a pair of symmetrical easy to compare beam shapes.

Other objects and advantages of the invention will be apparent from the following description, the accompanying drawings and the appended claims.

BRIEF DESCRIPTION OF THE DRAWINGS

FIGS. 2A, 2B and 2C are comparative depictions of image displays as produced by the device during its use;

FIG. 3 illustrates another form of image display;

FIG. 8 is a perspective view of a system including additional optical elements to the simpler version of system shown in FIG. 4;

FIG. 9 is a perspective view of a deviceshowing use of holograms as optical elements;

FIG. 10 is a perspective view of a target using multiple holograms on a common substrate; and FIG. 11 is a perspectve view of a target, showing a typical housing with input and viewing widows.

DESCRIPTION OF THE PREFERRED EMBODIMENT

Figure 1B:
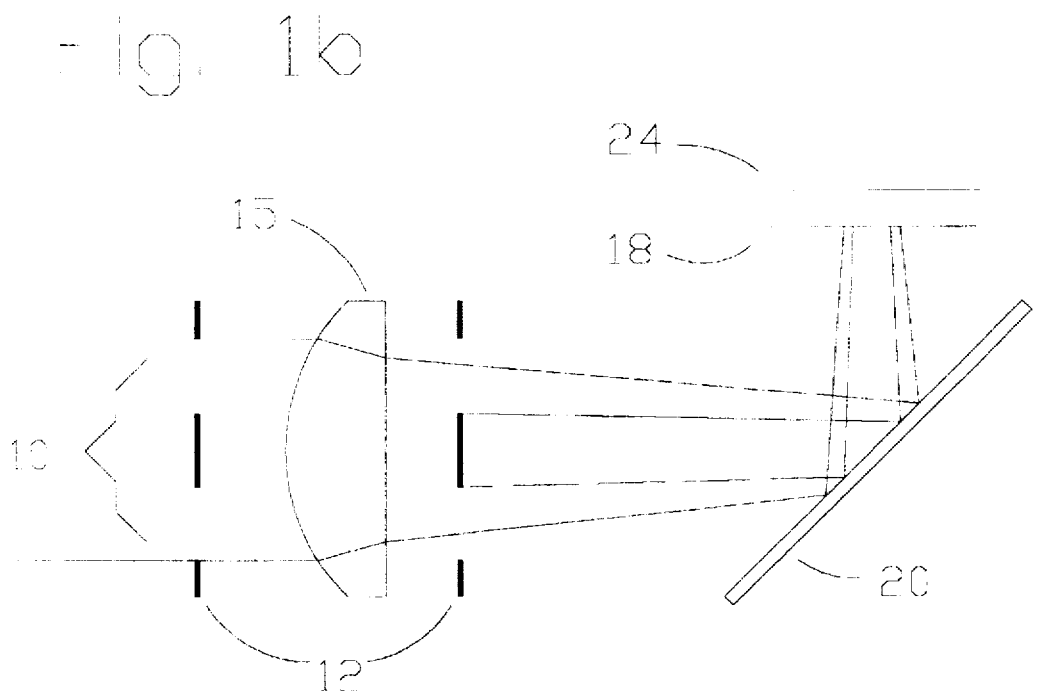
FIG. 1B is an enlarged perspective view of a mask divider as incoporated in FIG. 1A.
Figure 1C:
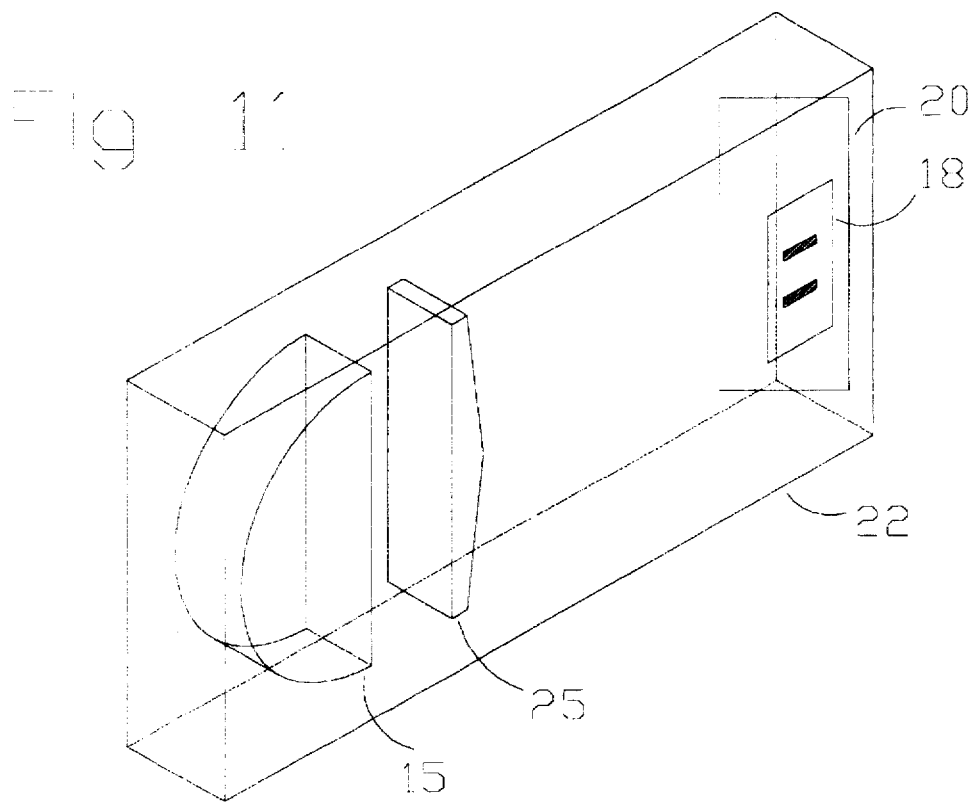
FIG. 1A is a schematic perspective view of a device according to the invention, incorporating a mask as a light beam divider.

Referring to FIG. 1, the incoming laser beam 10 is split into two equal parts 10A and 10B (when the device is on center of the incoming beam) by blocking a part of the beam. In this drawing a mask 12 is placed on the axis of beam 10 either before or after a lens 15. This lens can be a simple spherical lens or a cylindrical lens, and acts to reduce the beam 10 in size in both axes perpendicular to the beam (when using a positive spherical lens), or to reduce the beam 10 in one axis perpendicular to the beam (by using a positive cylindrical lens).

The split beams 10A, 10B proceed toward a viewing screen 18, either impinging directly on such screen, or being diverted through some angle by a prism or mirror, i.e. a reflector element 20, as may be convenient in a particular design. The beams 10A, 10B are projected onto viewing screen 18, which may be either a transmissive or reflective conventional diffuser, transmissive or reflective compound optic diffuser (as described in U.S. Pat. No. 5,095,629), or a transmissive or reflective holographic diffuser. It is understood that holographic diffusers are a specific form of diffractive optical elements.

The determination of the centerline of the incoming laser beam 10 is made from observing the ratio of the size and brightness of the two images from beams 10A and 10B, as shown on viewing screen 18. The human eye naturally and easily sets the dark space (due to the line on the mask) dividng the beam into two equal parts, as in FIGS. 1A and 2A.

It can be seen that the mask 12 is a passive device, and serves to block a central portion of beam 10, actually it is placed to block the central portion or light gathering portion of the light gathering device e.g. lens 15. If the above described optical system is mounted in a convenient small housing (indicated generally at 22) and is translated up and down, at the distant target area to be marked, in the vertical (y) axis of the incoming beam 10, the resultant images in the view screen will be as generally shown in FIG. 2B (target above the beam axis), in FIG. 2A (target on beam axis), and in FIG. 2C (target below the beam axis).

A particularly important advantage of this target is that it allows for readily finding the centerline of a scanning light beam (e.g. a laser beam) in normal room lighting (filters 24 can be added to provide adequate ambient light rejection). The target is also extremely tolerant of changes in the tilt angle of the housing with respect to the incoming scanning beam. Since mask 15 serves to divide or "split" the beam in equal halves when the housing input window is on center of the incoming beam, the viewer or user sees the relative position of the mask with respect to the beam. Stated another way, mask 15 projects a shadow of itself on the view screen 18, and the beam falls relative to it. The mask is precisely at one point in space, at the center of the beam; that spot is where the mask is physically at the center point of the beam. Therefore, if an index mark on the housing (see FIG. 10 and its later description) is coincident with the centerline or beam axis, then that mark, and the correct determination of the centerline, will be independent of rotation about that point.

Further enhancements can be made by employing more specialized different targets (masks) that can be conceived for aiding the human eye—brain's capability of finding a balance or centerpoint. The split beam image as in FIGS. 2A, 2B, 2C comprises symetrically shaped beams which can produce images which are easily compared in detail, so the observer can easily detect equality of the two images, or inequalities between them, with the unaided eye. As the target is moved above and below the scanned plane, images on the view screen would appear as in FIGS. 2B and 2C, and the equal images whereat the target is aligned with the center of the incoming beam, appear as in FIG. 2A.

The apparent motion of the light areas is observed because the design of the target and the changes in brightness of the projected areas influence the observer's visual perception. The lens 15 can actually be designed to enhance this effect. For example, it can be designed to be very sensitive close to the centerline and less sensitive farther away.

A working prototype of the above described device, has easily demonstrated level alignments to 1/16 inch (0.1588 mm.) without effort, using a 1/2 inch (1.27 mm.) diameter input beam from an HeNe laser source in a well lit office environment. Measurements to 1/32 inch (0.0794 mm.) are also easily done.

Figure 4:
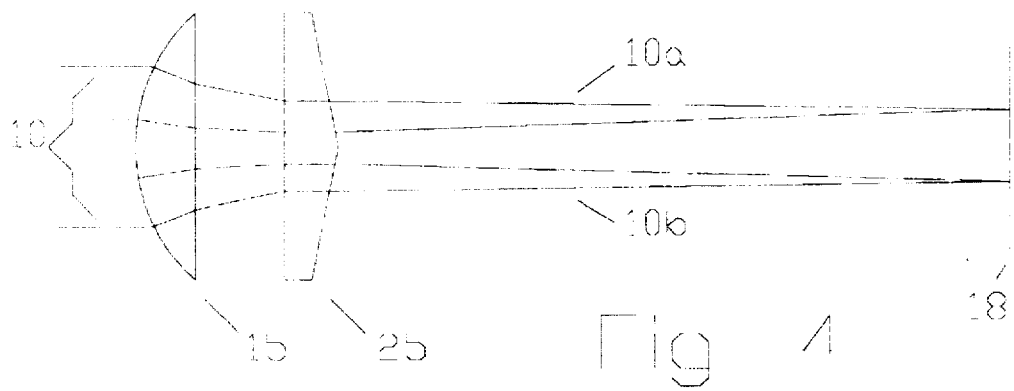
FIG. 4 is a schematic view of a device according to the invention as taken from the side of this optical system, employing an axicon as a beam divider, which can be used to produce images as in FIG. 3.

FIG. 4 shows the basic parts of a target system using an axicon (e.g. a biprism) 25 as a beam dividing element. In that system, the axicon divides the incoming beam (which is assumed to be symmetrical about its centerline) into parts 10A, 10B which are on equal intensity when the incoming light beam is on the center of the axicon 25. As the incoming beam moves above or below such centerline (as by moving the housing in which the system is confined) the two beam parts 10A and 10B will vary in intensity with respect to each other on viewing screen 18, providing to the viewer (user) a means to discern not only off-center position but the direction of such off-center position. By adjusting the position of the target housing vis-a-vis the incoming beam, the viewed images of the beam parts will change in intensity and when they appear equal, the optical centerline of the lens/axicon system will be aligned with the incoming scanning beam 10.

Figure 5:
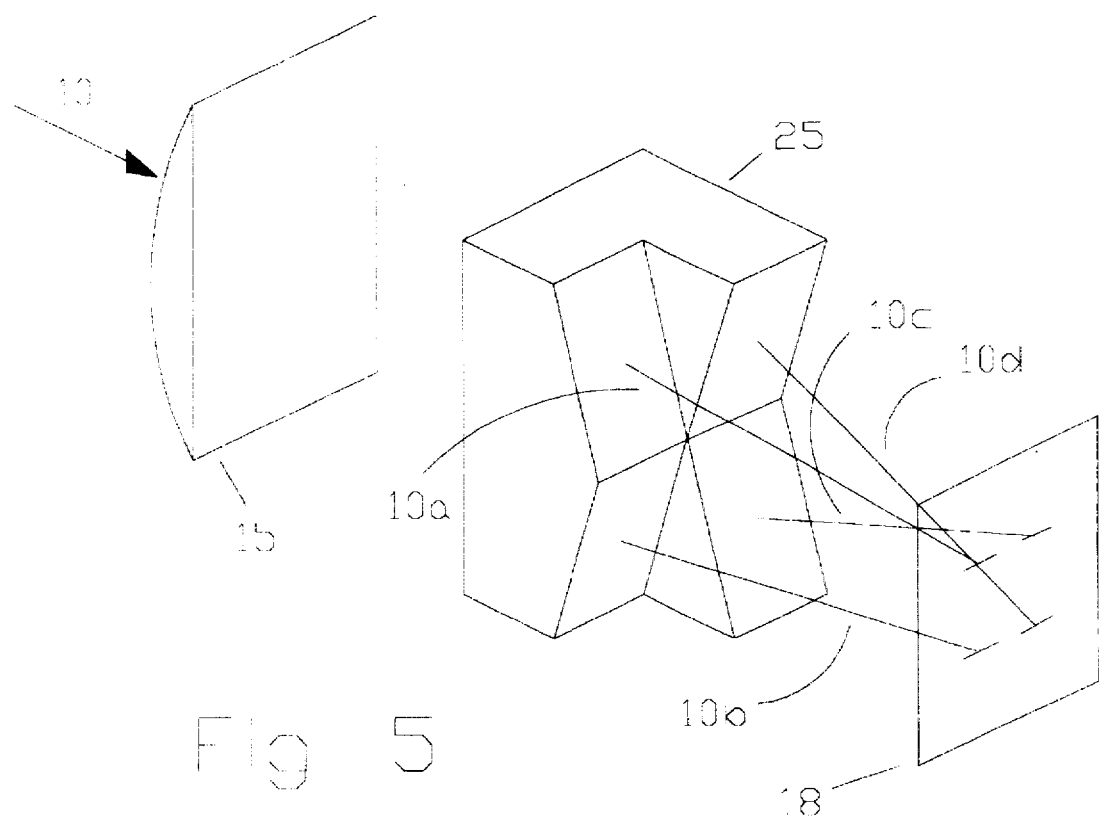
FIG. 5 is a schematic perspective view of a device according to the invention with a dual function axicon.

In FIG. 5 a more complex form of axicon 25 is illustrated, whereby the incoming beam 10 is divided into four parts 10A, 10B, 10C, 10D. The two axicons produce relatively inverse images, thus providing an improved means of discerning equality (or inequality) of the beam parts.

Figures 6, 7:
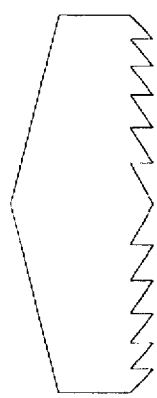
FIG. 6 is a comparative chart showing the images on the viewing screen when the target is above the center of the scanning beam, at the beam center, and below the beam center.
FIG. 7 is a schematic view of a compound optical element which combines the lens and beam dividing functions.

FIG. 7 is a schematic view of an optical element which incorporates the optical functions of a lens and an axicon, in this instance a Fresnel lens. Such comination elements will be obvious to persons of ordinary skill in the optical arts.

FIG. 8 is an expanded schematic perspective view of a target system in which a focusing cylindrical lens 15A is added ahead of lens 15, a prism 16 is added between axicon 25 and mirror 20, and optical wedges 26 and 27 are added after the diffuser viewing screen 18 for the purpose of directing the output beams at a desired angle.

FIG. 9 illustrates the substitution of holograms H25 and H18 for the lens/axicon combination and the viewing screen diffuser. This provides the advantage of achieving the dividing and visual differentiation of the beam parts with optical elements having minimal thickness. In FIG. 10, a combination of two holograms is formed on a single substrate, and the light beams can be directed through them either by appropriately located reflecting surfaces, or by bending the substrate between the holograms, as shown.

FIG. 11 shows a typical housing 22 which incorporates a cylindrical receiving lens 15 which passes the incoming scanning beam to an internal reflector 16, thence through an axicon mounted internally of the housing. The divided beams are then transmitted to a further reflector 20 mounted within the housing, and thence to the viewing window in which a diffusing screen (preferably a hologram) 18 is mounted. An alignment marker, such as a visual groove or ridge 23 about the exterior of housing 22, provides a reference which bisects the inlet and viewing windows and can be used to transfer an alignment marking to a surface adjacent which the target is held.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. In a system for providing elevation marks at a surface located at a distance from a source producing a collimated beam of light directed across the surface by moving the center of the beam to different locations along the surface, the improvement comprising a portable target adapted to be located at said surface, said target including beam dividing means for dividing the incoming light beam from the source when the incoming beam is impinging on said target into at least two adjacent component beams within the target, a viewing screen, means for directing the the component beams onto said viewing screen to produce adjacent images on said viewing screen for comparison as to visual equality of size and intensity.

2. A system as defined in claim 1, wherein said target further includes a housing having an inlet window for said beam dividing means and a viewing window, an alignment indicator on said housing located at a predetermined position with respect to said windows, whereby said housing can be located on said surface and adjusted with respect to the incoming light beam until the images from the component beams appear equal on said viewing screen, and the alignment indicator can be used to mark the surface.

3. A system as defined in claim 1, wherein said means for dividing the incoming beam is an axicon.

4. A system as defined in claim 1, wherein said means for dividing the incoming beam comprises a mask having two spaced apart apertures dividing the incoming beam into parts.

5. A system as defined in claim 1, wherein said viewing screen is a diffusing surface onto which the component beams impinge to form adjacent images to be compared.

6. A system as defined in claim 1, wherein said means for dividing the incoming beam is a diffractive optical element.

7. A system as defined in claim 6, wherein said diffractive optical element for dividing the incoming beam is a hologram.

8. A system as defined in claim 1, wherein said viewing screen is a diffractive optical element.

9. A system as defined in claim 8, wherein said diffractive optical element is a hologram.

10. A passive hand held target for locating the center of a scanning light beam impinged repeatedly on said target from a remote scanning source, comprising a housing having an input window and a viewing window spaced apart on said housing, a beam splitter in said housing between said windows to divide a beam entering said input window into component beams, a viewing screen at said viewing window receiving the component beams in adjacent locations and producing adjacent images thereon, whereby an observer can discern equality and inequalities of the adjacent images as the target is moved to center said input window with respect to the input scanning light beam such that the component beams produce balanced images on said viewing screen when the incoming laser beam is centered with respect to said input aperture.

11. A target as defined in claim 10, wherein said beam splitting means is an axicon.

12. A target as defined in claim 10, wherein said beam splitting means comprises a mask having two spaced apart apertures dividing the incoming beam into parts.

13. A target as defined in claim 10, wherein said viewing screen is a diffusing surface onto which the divided beam impinges to form a pair of images to be compared.

14. A target as defined in claim 10, wherein said beam splitting means is a diffractive optical element.

15. A target as defined in claim 14, wherein said diffractive optical element for dividing the incoming beam is a hologram.

16. A target as defined in claim 10, wherein said viewing screen is a diffractive optical element.

17. A target as defined in claim 16, wherein said diffractive optical element is a hologram.

18. The method of determining the location of the center of an incoming light beam as the beam is directed against a predetermined object, comprising positioning a target to be impinged upon by the light beam and dividing the incoming light beam in the target into component beams with a beam dividing device, directing the component beams against a viewing screen in the target to produce adjacent images on the screen, and adjusting the target relative to said incoming light beam until the adjacent images appear equal in size and intensity.

19. The method of determining the location of the center of an incoming light beam as the beam is moved across a predetermined object, comprising providing a portable passive target which can be held at one or more predetermined locations adjacent the object, the target dividing the incoming light beam into component beams within the target with a beam dividing device, directing the component beams within the target against a viewing screen on a surface of the target to produce adjacent images on the screen, and adjusting the target relative to the incoming light beam until the images appear equal.

* * * * *